J. C. WAGGONER.
Smut Mill.
No. 82,898.                                            Patented Oct. 6, 1868.
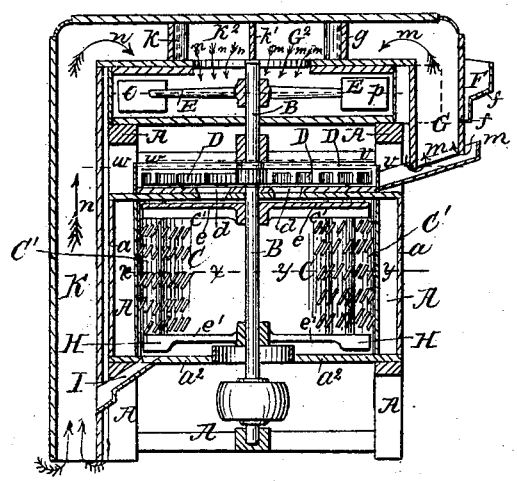
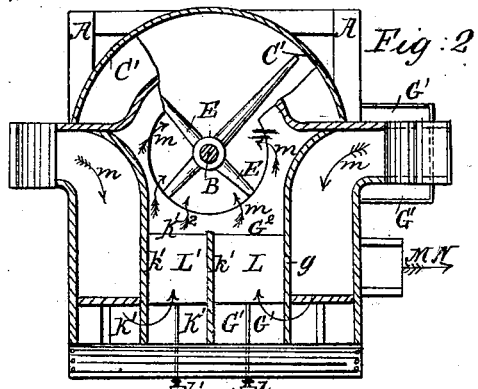
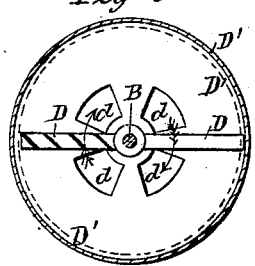
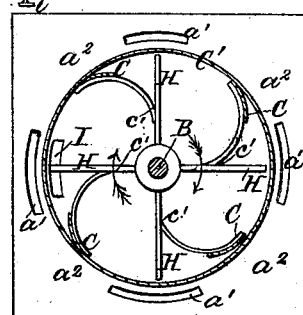
Witnesses.
Geo. P. Herthel Jr.
M. Randolph.
Inventor.
J. C. Waggoner

United States Patent Office.

J. C. WAGGONER, OF ST. LOUIS, MISSOURI.

Letters Patent No. 82,898, dated October 6, 1868.

IMPROVED SMUT-MILL.

*The Schedule referred to in these Letters Patent and making part of the same.*

TO ALL WHOM IT MAY CONCERN:

Be it known that I, J. C. WAGGONER, of St. Louis, in the county of St. Louis, and State of Missouri, have made certain new and useful Improvements in Smut and Scouring-Mills; and I do hereby declare that the following is a full and clear description thereof, reference being had to the accompanying drawings, and to the letters of reference marked thereon.

This invention relates to six general improvements in the smut-mill, viz:

Firstly, an improvement in the feeding-spout, by means of which the grain is sent into the machine in a shower, thereby exposing all of its kernels to the action of the machine, which could not be done by the old machines, to which the grain was delivered in a solid column.

The second feature of the invention relates to a distributer, situated at the top of the machine, and employed for the purpose of still further distributing the grain uniformly to the operative parts of the machine.

The third and fourth features of the invention relate to curved and perforated beaters for scouring the grain.

The fifth relates to rotating discharging-wings, for delivering the finished grain from the machine; and the sixth to an arrangement of the air-tubes.

To enable those skilled in the art to make and use my improved machine, I will proceed to describe its construction and operation.

Figure 1 of the drawings is a central sectional elevation of the improved machine.

Figure 2 is a sectional plan of the same, taken on the line *o p* of fig. 1.

Figure 3 is a similar plan, taken on the line *u v* of fig. 1.

Figure 4 is a similar plan, taken on the line *x y* of fig. 1.

The frame A furnishes support for the operative parts of the machine, among which are the central vertical driving-shaft B, the curved perforated beaters C, the distributer D, and the fan or blower E. A housing, *a*, surrounds the cylindrical perforated casing C', that encloses the beaters C.

The grain to be cleaned in this machine is delivered by means of a spout, (not shown,) to the shoe F, which has an inclined floor, *f*. From this inclined floor the grain passes in a shower, across the bottom end of the blast-pipe G, and falls on the inclined floor of the shoe $G^1$, which discharges the grain again in a shower into the distributing-head D'. From this distributing-head the inclined rotating distributers D scrape the grain through the apertures *d*, whence it falls on to the rotating head *c* of the beaters C. From this distributing-head the grain is thrown, in an annular shower, into the space between the rotating beaters C and the perforated casing C', and while falling through this space, the grain is thoroughly rubbed by the action of the said rotating beaters and the perforated casing. The forward faces of the beaters C are convex, as is most clearly shown in fig. 4, and they are perforated with diagonal slots, as is clearly shown in fig. 1. These beaters are attached to the radial arms *c'*, and actuated by the central driving-shaft B, as is clearly shown in figs. 1 and 4. The action of these curved perforated beaters, as they are rapidly rotated, is to strike and rub the whole of the kernals of the grain smooth and clean, and also to expel by their centrifugal action, the light particles adhering to the surface of the grain, through the perforations of the casing C', from whence these refuse particles fall through the apertures $a^1$ of the floor $a^2$.

In order to dislodge the grain which falls to the floor $a^2$ in an annular shower, as above described, I employ rotating discharging-wings H, secured to and operated by the central shaft B. These wings scrape all of the grain to one side, so as to permit it to escape, through the discharge-spout I, into the bottom part of the upcast blast-tube K. The same construction of the floor of this spout I is observed as in the construction of the shoe F, so as to permit the grain to pass into the tube K in a shower, thereby more effectually exposing it to the action of the blast contained therein.

Strong air-currents enter the blast-tubes G and K in the direction of the arrows *m m*, and these air-currents pass up to the top of the machine, and under the partitions *g k*, at which points they drop into pockets $G^1 K^1$ any heavy refuse grain which they may carry over with them. After passing over these pockets, the currents $m$ $m$ enter the horizontal ducts $G^2$ $K^2$ at the top of the machine, whence they pass down to the blower E, which drives them and all the very light chaff and dust out of the waste-duct at M N. The cleaned grain from the spout I passes out at the bottom end of the tube K. Thus it will be seen that the grain, both in entering the machine and in leaving it, is subjected to heavy air-currents of the tubes G and K. The intensity of the currents in G and K may be regulated by means of the adjustable slides L L', which may be set by means of the rods $l$ $l'$, so as to contract the entrance to the ducts $G^2$ $K^2$ to any extent required.

Having described my invention, what I claim, is—

1. The feed-shoe, F, arranged with two short inclined floors, $f$, upon which the falling grain shall strike and from which it shall be precipitated in a "shower" upon the pocket $G^1$, and in combination with the super-poised blast-tube G, substantially as set forth.

2. The discharging-wings H, in combination with the curved beaters C, acting substantially as set forth.

3. The blast-tubes G and K, and their ducts, $G^2$ $K^2$, the regulating slides L and L', and the fan E, all acting substantially as and for the purpose set forth.

J. C. WAGGONER.

Witnesses:
M. RANDOLPH,
ROBERT BURNS.